United States Patent [19]
Merriken

[11] Patent Number: 5,666,456
[45] Date of Patent: Sep. 9, 1997

[54] GUIDE TOOL AND METHOD FOR ACCURATELY MATING STACKS OF MULTI-FIBER OPTICAL CONNECTORS WITH GUIDE PINS

[75] Inventor: James R. Merriken, Hudson, N.C.

[73] Assignee: Siecor Corporation, Hickory, N.C.

[21] Appl. No.: 659,472

[22] Filed: Jun. 5, 1996

[51] Int. Cl.[6] .................................................. G02B 6/36
[52] U.S. Cl. .......................... 385/134; 385/147; 385/56; 385/25
[58] Field of Search ............................... 385/16, 17, 20, 385/21, 22, 23, 25, 53, 54, 55, 56, 134, 147

[56] References Cited

U.S. PATENT DOCUMENTS

| | | | |
|---|---|---|---|
| 4,765,710 | 8/1988 | Burmeister et al. | 385/135 |
| 5,442,724 | 8/1995 | Deuel | 385/134 |

Primary Examiner—John Ngo
Attorney, Agent, or Firm—Wesley T. Noah

[57] ABSTRACT

A guide tool and associated method are provided for inserting guide pins in a plurality of stacked multi-fiber connectors and for mating two opposed stacks of multi-fiber connectors. The guide tool comprises a rail with a first and a second mount disposed thereon. At least one of the mounts is slidably disposed on the rail. The mounts receive a stack of multi-fiber connectors or a pin applicator body. In operation, a first stack of multi-fiber connectors are disposed in the first mount, a pin applicator is disposed in the second mount, the second mount is slid along the rail until the guide pins are operatively inserted into the first stack of connectors. The applicator is removed from the second mount and a second stack of connectors can be disposed therein for being slid into an operative mating relationship with the first stack of connectors.

11 Claims, 4 Drawing Sheets

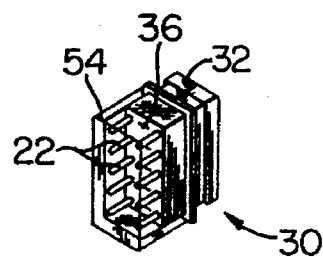
FIG. 1.
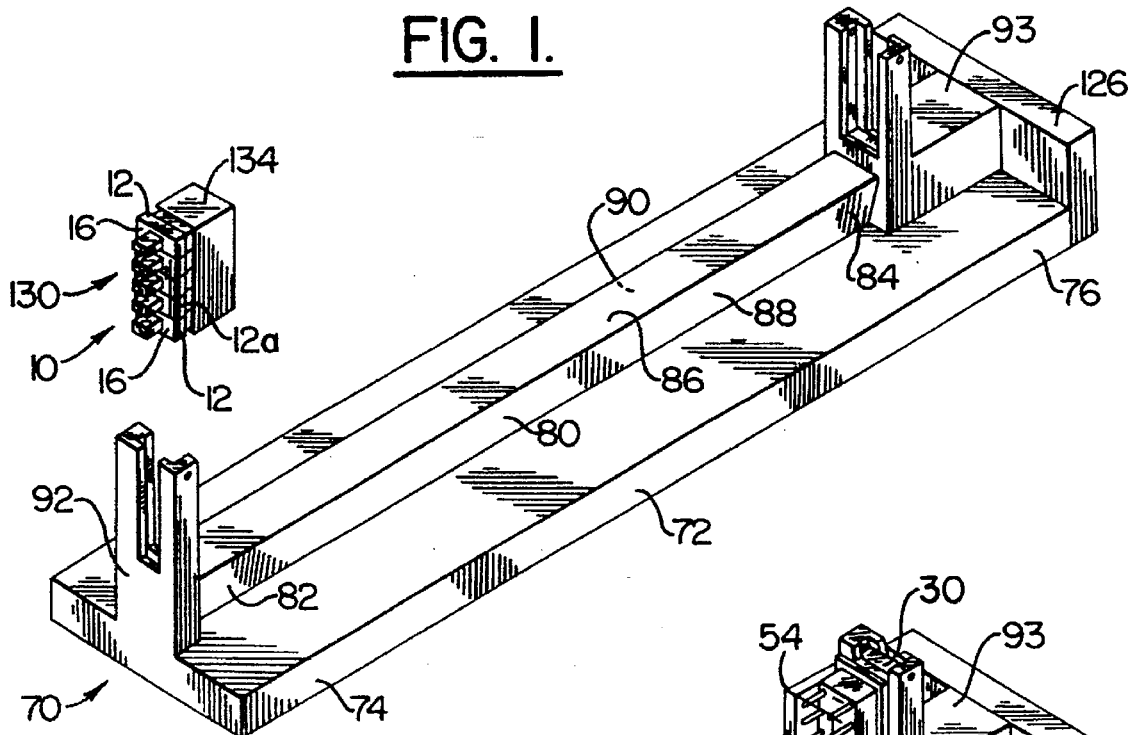
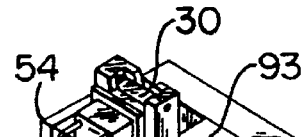
FIG. 2.
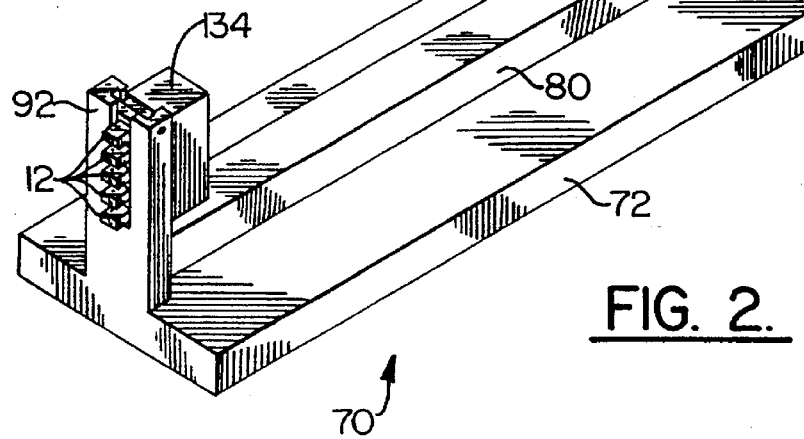

GUIDE TOOL AND METHOD FOR ACCURATELY MATING STACKS OF MULTI-FIBER OPTICAL CONNECTORS WITH GUIDE PINS

BACKGROUND OF THE INVENTION

The present invention relates to a guide tool and method that is usable with the invention of co-pending application Ser. No. 08/487,765 filed Jun. 8, 1995 and entitled "Applicator and Associated Method for Inserting Guide Pins in a Fiber Optic Connector." The subject matter of such application is incorporated herein by reference. U.S. Pat. No. 5,214,730 to Nagasawa et al. further discloses multi-fiber ferrules of the type that are intended to be used with the present invention. See, e.g., FIGS. 1–4 of Nagasawa. It should be understood that the present invention is not limited to use with such multi-fiber ferrules.

Because of the small size of the multi-fiber connectors shown in Nagasawa and the necessary preparatory steps discussed in co-pending application Ser. No. 08/487,765, the conditions in the field, and the large numbers of connectors to be mated in a typical connector closure, it becomes difficult for the craft to accurately install guide pins and mate connectors accurately and efficiently over a period of time. With respect to mating the connectors, once the pins and gel have been applied to a plurality of fiber optic connectors, each of the connectors must then be mated with another pinless connector one at a time. The need to align the pins into the holes of a pinless connector is extremely time consuming, especially when performed one pair of connectors at a time. Therefore, there is a need to be able to more efficiently and accurately install pins and gel to one plurality of connectors and mate the pinned connectors with a corresponding plurality of pinless connectors.

SUMMARY OF THE INVENTION

It is an object of the present invention to provide a guide tool and associated method to use the applicator of co-pending Ser. No. 08/487,765 in a more efficient and accurate manner than by relying on eye-hand coordination of the craft. It is a further object that such guide tool also be able to then mate a stacked set of pin-applied connectors with a corresponding stacked set of pinless connectors in a more efficient and accurate manner.

In one aspect of the present invention, a guide tool is provided for mating a first stack and a second stack of multi-fiber connectors to each other, the connectors having at least one guide pin bore for receiving a guide pin that aligns two connectors as they are mated. The guide tool comprises a rail having a first end and a second end opposite thereto and a first mount and a second mount mounted on the rail. At least the second mount is slidably mounted on the rail such that the second mount can be slid along the rail to close proximity with the first mount. The first and second mounts are structured to receive the first and the second stacks of multi-fiber connectors, respectively, opposite each other so that the two stacks can be operatively mated by sliding the second mount along the rail toward the first mount.

In another aspect of the invention, a method is provided for simultaneously mating a plurality of pairs of multi-fiber connectors. The method comprises the steps of placing a first stack of connectors in a channel defined in a first mount that is mounted at one end of a rail, and placing a second stack of connectors in a channel defined in a second mount that is slidably mounted on the rail. The first and second channels are generally parallel and oriented such that the two stacks of connectors are aligned for mating. Then the second mount is slid toward the first mount until each of the connectors of the first stack of connectors is operatively mated with a respective connector from the second stack of connectors.

In a further aspect of the invention, a method is provided for applying a plurality of guide pins to a plurality of multi-fiber connectors simultaneously. The method comprises the steps of placing a first stack of connectors in a channel defined in a first mount that is mounted at one end of a rail, and placing a pin applicator in a channel defined in a second mount that is slidably mounted on the rail. The applicator has an array of guide pins protruding from a surface facing toward the first stack of connectors. Then the second mount is slid toward the first mount until each of the guide pins are operatively inserted into the connectors of the first stack of connectors. Then the second mount is slid away from the first mount such that the guide pins withdraw from the applicator and remain in the connectors of the first stack of connectors.

BRIEF DESCRIPTION OF THE DRAWINGS

FIG. 1 is perspective view of the preferred embodiment of a guide tool of the present invention before placement of a stack of connectors and a guide pin applicator thereon;

FIG. 2 is a perspective view of the guide tool with the stack of connectors and the applicator placed thereon;

DETAILED DESCRIPTION

Figure 3:
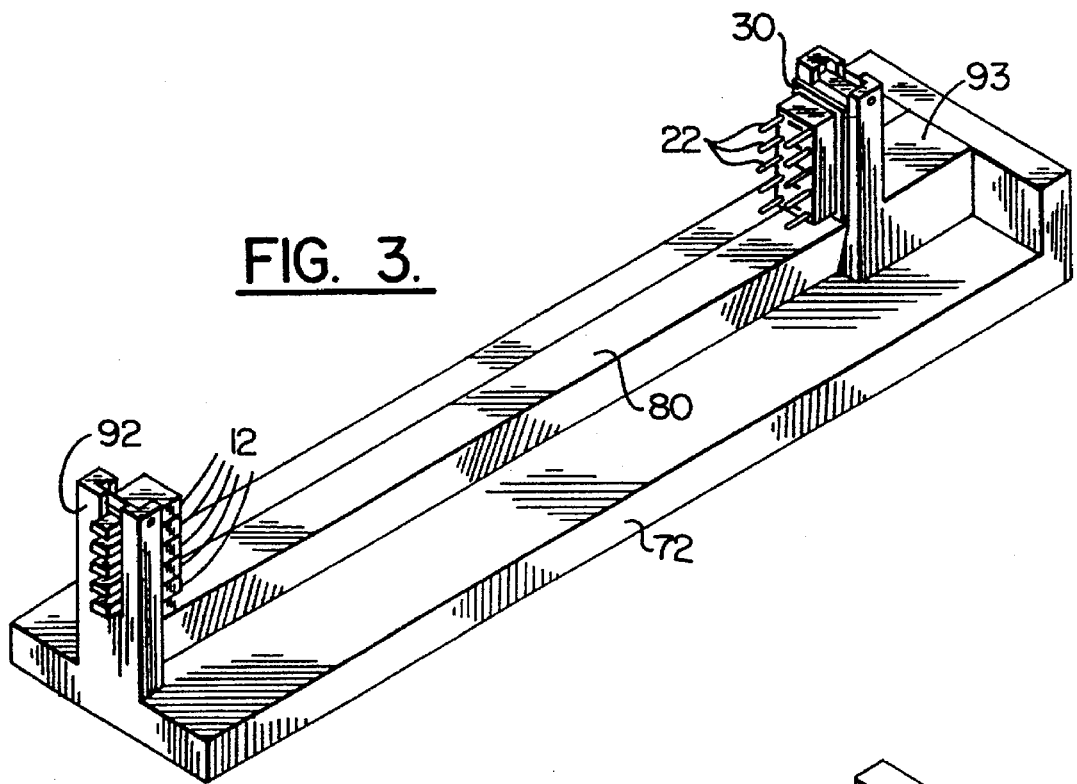
FIG. 3 is a perspective view of the guide tool with the stack of connectors and the applicator uncovered.

With reference to FIGS. 1–7, the preferred embodiment of the guide tool and associated method of installing guide pins and mating connector assemblies is shown. The reference numerals used in co-pending application Ser. No. 08/487,765 will be used for similar items depicted herein. The fibers that extend from the rear of connectors 12 have not been illustrated except for one pair of connectors in FIG. 7 for ease of explanation.

Guide tool 70 comprises a base 72 having a first end 74 and second end 76. Mounted along the base is at least one rail 80 extending linearly in a longitudinal direction and having a first end 82 and second end 84. Rail 80 has a top surface 86 and two side surfaces 88 and 90 that slope inwardly as they approach base 72. Rail 80 may be integral with base 72 or affixed thereto.

Figure 7:
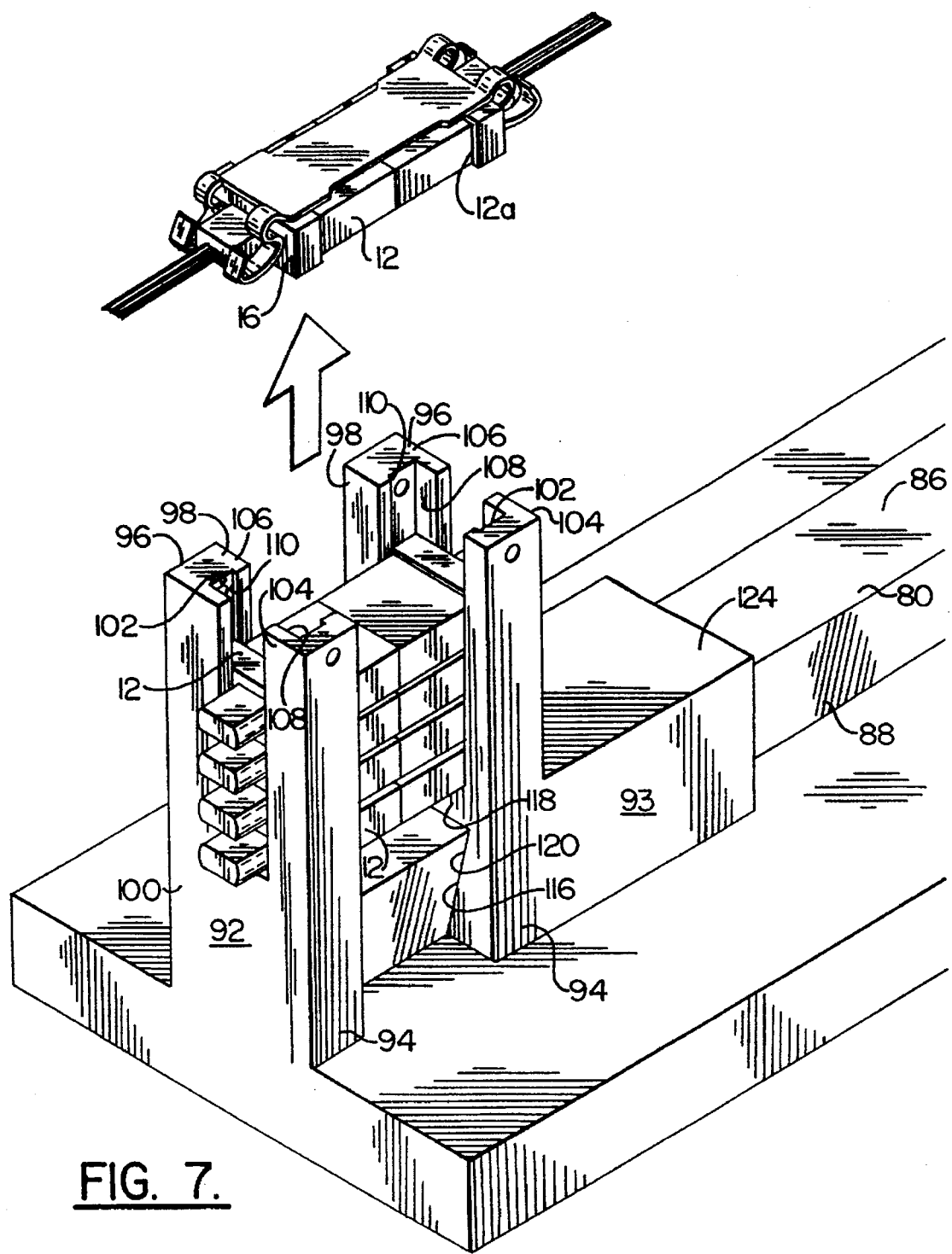
FIG. 7 is a perspective partial view of the guide tool with depicting the removal and clamping of a pair of connectors from the guide tool.

First end 82 of rail 80 terminates at first mount 92 which is fixed relative to rail 80. Second mount 93 is slidably mounted on rail 80 and can travel from second end 84 of rail 80 to first end 82 of rail 80. First mount 92 and second mount 93, although of different configurations, have several features in common. With reference to FIG. 7 for more detail, each mount has bottom end 94 and top end 96. Each mount has inside surface 98 facing toward the middle of rail 80 and outside surface 100 facing opposite thereto. Each mount defines vertical channel 102 extending in the vertical direction and that opens through top end 96, inside surface 98 and outside surface 100 for receiving a plurality of connectors 12 in a stacked relation.

Each mount can be described alternatively as having two parallel posts 104 and 106 that extending vertically upward from each mount in a plane normal to the longitudinal direction. Posts 104 and 106 are configured to slidably receive a stack of connectors 12 therebetween. Posts 104 and 106 each have back shoulder 108 extending vertically therealong for being disposed against rear surfaces 16 of connectors 12 when the connectors are stacked between posts 104 and 106. Posts 104 and 106 also have front shoulder 110 extending vertically therealong for being disposed against raised shoulder 12a of connectors 12 when the connectors are stacked between posts 104 and 106. As such, back shoulders 108 and front shoulders 110 capture connectors 12 in the same manner as alignment shell 14 shown in FIGS. 8 and 9 of co-pending application Ser. No. 08/487,765.

With continued reference to FIG. 7 for detail, second mount 93 defines rail channel 116 that slidably receives rail 80. Rail channel 116 has upper surface 118 that slides along top surface 86 of rail 80. Rail channel 116 further has side surfaces 120 and 122 that are angled inward at generally the same angle as and slide along side surfaces 88 and 90, respectively. By having angled side surfaces, second mount 93 is prevented from raising off of top surface 86 of rail 80. The tolerances between rail channel 116 and rail 80 can be such to achieve precise linear travel of second mount 93 along rail 80. Additionally, second mount has footer section 124 extending in a generally longitudinal direction so as to lengthen rail channel 116. The additional length of rail channel 116 contributes to the preciseness of the linear movement of second mount 93 by preventing cocking of second mount 93 on rail 80 which could be caused by pushing against the top of posts 104 and 106 of second mount 93.

Guide tool 70 has stop piece 126 attached at second end 76 of base 72 to prevent second mount 93 from traveling off of second end 84 of rail 80 in a linear direction. Stop piece 126 is removable to allow removal of second mount 93 from rail 80 when necessary.

As an alternative embodiment, base 72 may be eliminated and instead the assembly of rail 80, first mount 92 and second mount 93 may be mounted on a hand held, trigger-activated structure and/or clamped to a structure at the work site, for example, the frame of a splice closure. The distance of separation between first mount 92 and second mount 93 needed to allow easy loading of connectors in the mounts is short enough to allow adaptation of the guide tool to a hand held, trigger-activated configuration.

Each mount can receive either a stack of connectors 12 or an applicator 30. It should be understood that while the guide tool of the present invention is particularly useful in simultaneous mating of multiple connectors, the guide tool may be used to mate only one pair of connectors and as such a stack of connectors comprises at least one connector. As can be seen from FIG. 2 of co-pending application Ser. No. 08/487,765, carrier body 32 has a portion of its geometry that is the same as the portion of connectors 12 received between back shoulders 108 and front shoulders 110 of the mounts 92 and 93. As such, the guide tool of the present invention may be used in two applications: (1) precisely guiding an applicator toward a stack of connectors 12 to simultaneously insert an array of pins in the stack of connectors, and/or (2) precisely guiding a stack of pinned connectors together with a stack of unpinned connectors to simultaneously mate several multi-fiber connectors. Applications (1) and (2) can be performed in succession for efficient and precise pinning and mating of a plurality of multi-fiber connectors simultaneously.

Figure 4:
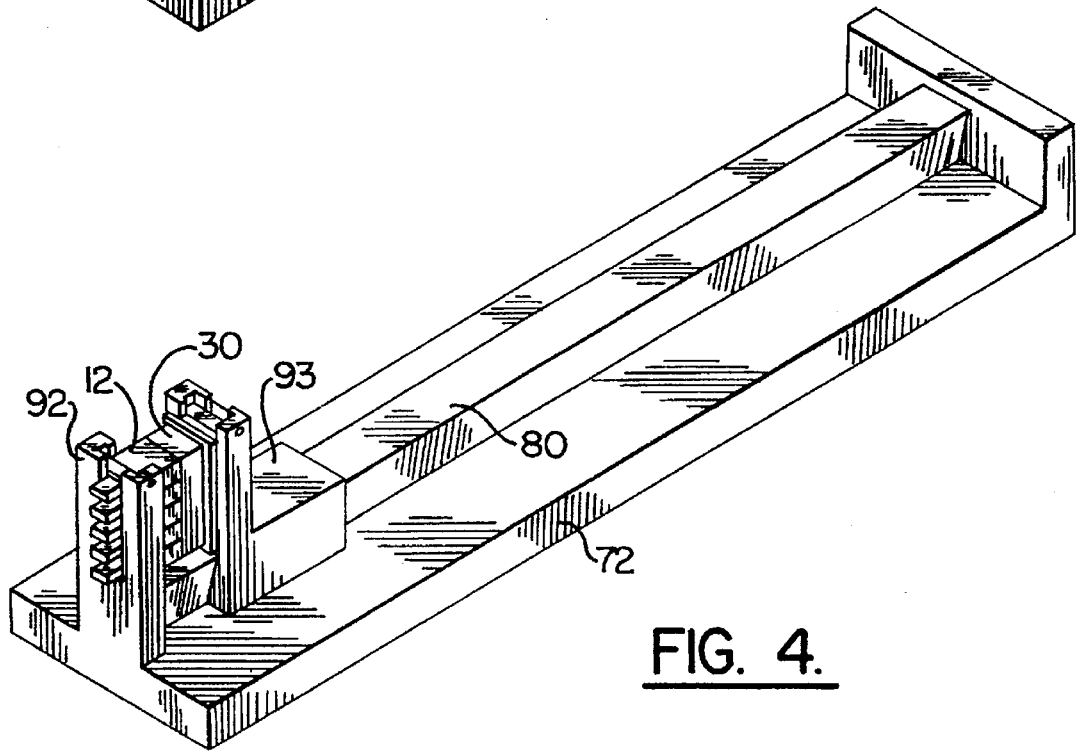
FIG. 4 is a perspective view of the guide tool with the slide of the guide tool translated to install the pins in the stack of connectors.
Figure 5:
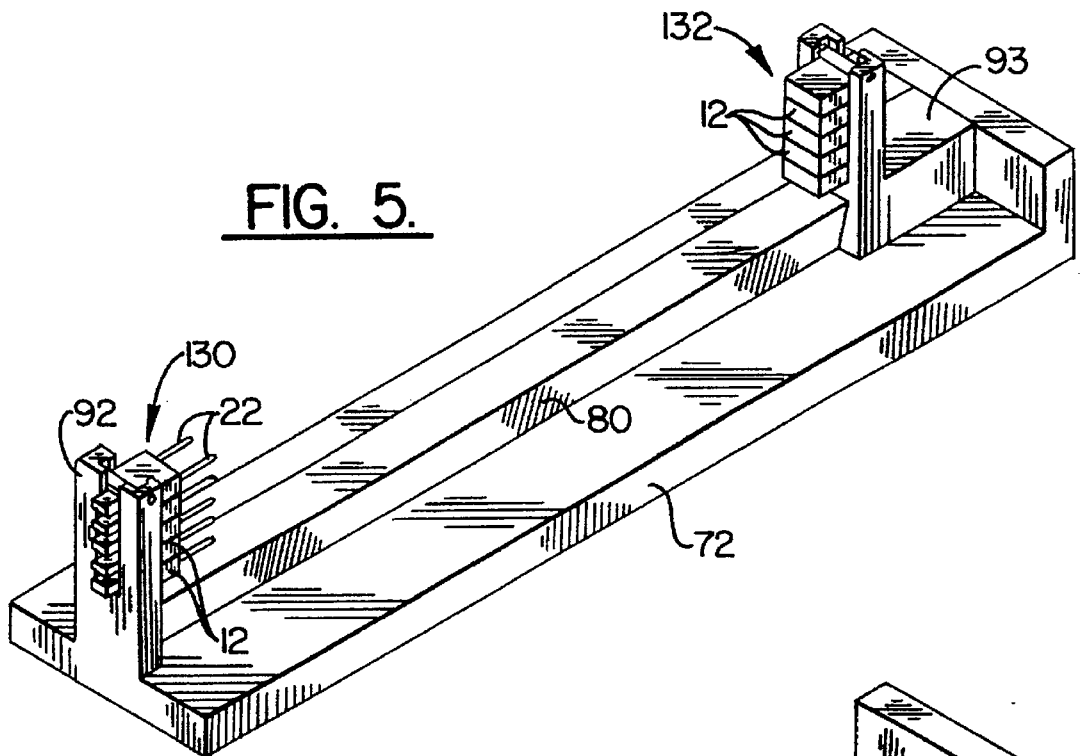
FIG. 5 is a perspective view of the guide tool with another stack of connectors placed thereon for mating with the pinned stack of connectors.
Figure 6:
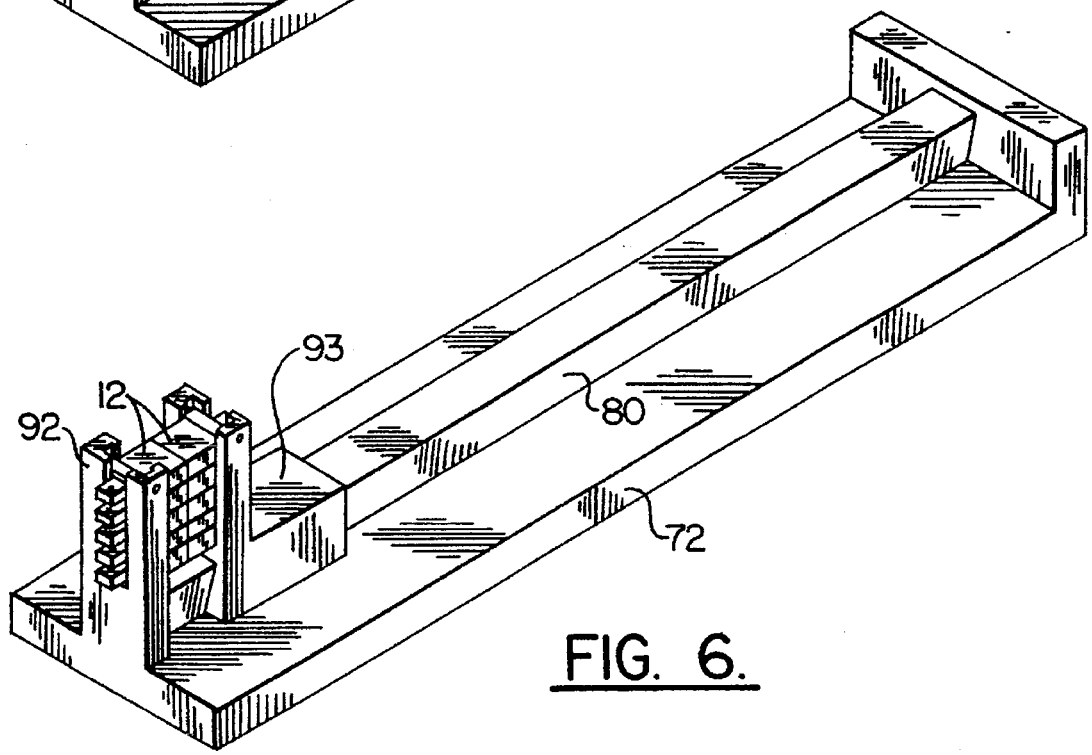
FIG. 6 is a perspective view of the guide tool with the slide of the guide tool translated to mate the two stacks of connectors.

The preferred embodiment of the method of the present invention and the operation of the guide tool of the present invention can be seen with reference to FIG. 1-7. FIGS. 1-4 illustrate the preferred steps of simultaneously pinning a first stack 130 of connectors 12 with applicator 30, and FIGS. 5-7 illustrate the preferred steps of simultaneously mating a second stack 132 of connectors 12 to first stack 130 of connectors 12.

FIG. 1 shows connector assembly 10 disposed for insertion into first mount 92 with first stack 130 of connectors 12 disposed in cap 134. Cap 134 is optional but facilitates the stacking of connectors 12 for insertion into first mount 92. Rear surface 16 and raised shoulder 12a of connectors 12 remain exposed when received in cap 134. Applicator 30 is shown disposed for insertion into second mount 93. Applicator 30 has guide pins 22 extending from first surface 36. A gel can be applied to first surface 36 as disclosed in co-pending Ser. No. 08/487,765. Cover 54 is initially placed over first surface 36 to protect the guide pins and gel from disturbance.

FIG. 2 depicts first stack 130 disposed in first mount 92. Rear surface 16 and raised shoulder 12a are received in the channel defined between back shoulder 108 and front shoulder 110 of first mount 92. FIG. 2 also depicts applicator 30 disposed in second mount 93.

In FIG. 3 cap 134 has been removed from first stack 130 of connectors and cover 54 has been removed from applicator 30. In FIG. 4, second mount 93 has been slid along rail 80 until guide pins 22 are operatively inserted into connectors 12 of first stack 130. In FIG. 4, gel can also be transferred from first surface 36 of applicator 30 to the surface of connectors 12.

In FIG. 5, applicator 30 has been removed from second mount 93 and second stack 132 of connectors 12 has been disposed in second mount 93. In FIG. 6, second mount has been slid along rail 80 until second stack 132 of connectors 12 has been operatively mated to first stack 130 of connectors 12. Guide pins 22 from first stack 130 are received in the guide pin holes of the connectors of second stack 132 to precisely align each pair of mated connectors.

FIG. 7 shows that each pair of mated connectors 12 may be lifted out of first mount 92 and spring clipped as is known in the art. After the mated pairs of connectors 12 have been removed from the mounts, second mount 93 is simply slid back along rail 80 to second end 84 and guide tool 70 is ready for another operation.

Although the present invention has been described with respect to certain embodiments, it should be understood that various changes, substitutions and modifications may be suggested to one skilled in the art, and it is intended that the present invention encompass such changes, substitutions and modifications as fall within the scope of the appended claims.

I claim:

1. A guide tool for mating a first stack and a second stack of multi-fiber connectors to each other, the connectors having at least one guide pin bore for receiving a guide pin that aligns two connectors as they are mated, the guide tool comprising:

(a) a rail having a first end and a second end opposite thereto;

(b) a first mount and a second mount mounted on the rail, at least the second mount slidably mounted on the rail such that the second mount can be slid along the rail to close proximity with the first mount, the first and second mounts structured to receive the first and the second stacks of multi-fiber connectors, respectively, opposite each other so that the two stacks can be operatively mated by sliding the second mount along the rail toward the first mount.

2. The guide tool of claim 1 wherein the first mount is fixed relative to the rail.

3. The guide tool of claim 1 wherein the second mount comprises a rail channel defined therethrough and dimensioned to slidably receive the rail and wherein the interengagement between the rail and the rail channel is such that inadvertent upward movement of the second mount relative to the rail is prevented.

4. The guide tool of claim 1 wherein the first and second mounts each have parallel posts extending upwardly and each of said posts have opposed shoulders along its length, the shoulders spaced apart so as to slidably receive at least a portion of a stack of connectors therebetween.

5. The guide tool of claim 3 wherein the second mount as a footer portion extending in a longitudinal direction with the rail channel further defined therethrough.

6. A method for simultaneously mating a plurality of pairs of multi-fiber connectors comprising the steps of:

(a) placing a first stack of connectors in a channel defined in a first mount that is mounted at one end of a rail;

(b) placing a second stack of connectors in a channel defined in a second mount that is slidably mounted on the rail, the first and second channels being generally parallel and oriented such that the two stacks of connectors are aligned for mating;

(c) sliding the second mount toward the first mount until each of the connectors of the first stack of connectors is operatively mated with a respective connector from the second stack of connectors.

7. The method of claim 6 further comprising the step of removing the mated pairs of connectors from the first and second mounts.

8. A method of applying a plurality of guide pins to a plurality of multi-fiber connectors simultaneously, comprising the steps of:

(a) placing a first stack of connectors in a channel defined in a first mount that is mounted at one end of a rail;

(b) placing a pin applicator in a channel defined in a second mount that is slidably mounted on the rail, the applicator having an array of guide pins protruding from a surface facing toward the first stack of connectors;

(c) sliding the second mount toward the first mount until each the guide pins are operatively inserted into the connectors of the first stack of connectors;

(d) sliding the second mount away from the first mount such that the guide pins withdraw from the applicator and remain in the connectors of the first stack of connectors.

9. The method of claim 8 further comprising the step of placing index matching gel on the pin applicator such that when the guide pins are inserted into the first stack of connectors, at least a portion of the gel will transfer from the applicator to the opposed face of the stack of connectors.

10. The method of claim 8 further comprising the steps of:

(e) removing the applicator from the second mount;

(f) placing a second stack of connectors in a channel defined in the second mount; and (g) sliding the second mount toward the first mount until each of the connectors of the first stack of connectors is operatively mated with a respective connector from the second stack of connectors.

11. The method of claim 10 further comprising the step of successively removing the mated pairs of connectors from the first and second mounts and spring clipping each pair of connectors.

* * * * *